United States Patent
McLeran

(10) Patent No.: US 7,349,172 B2
(45) Date of Patent: Mar. 25, 2008

(54) CERTIFYING CONCENTRIC DATA IN ECCENTRIC SERVO DATA TRACKS OF PRE-FORMATTED MEDIA

(75) Inventor: Dan R. McLeran, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 57 days.

(21) Appl. No.: 11/506,934

(22) Filed: Aug. 18, 2006

(65) Prior Publication Data

US 2008/0043362 A1 Feb. 21, 2008

(51) Int. Cl.
*G11B 5/596* (2006.01)

(52) U.S. Cl. .................................. 360/77.07

(58) Field of Classification Search ............ 360/77.07, 360/77.05, 78.04, 78.14, 48, 53, 77.02, 31, 360/51; 711/162
See application file for complete search history.

(56) References Cited

U.S. PATENT DOCUMENTS

| | | | |
|---|---|---|---|
| 5,822,773 A * | 10/1998 | Pritchard et al. ............ 711/162 |
| 6,411,452 B1 * | 6/2002 | Cloke ........................... 360/51 |
| 6,441,981 B1 * | 8/2002 | Cloke et al. ................... 360/51 |
| 6,839,763 B1 * | 1/2005 | Kamvysselis et al. ...... 709/230 |
| 6,898,033 B2 * | 5/2005 | Weinstein et al. ............ 360/31 |
| 6,947,232 B2 | 9/2005 | Lim et al. |
| 7,035,039 B2 * | 4/2006 | Shitara et al. ........... 360/77.07 |
| 2002/0145966 A1 * | 10/2002 | Hirotsune et al. ......... 369/275.3 |
| 2003/0147171 A1 | 8/2003 | Li et al. |
| 2004/0145825 A1 * | 7/2004 | Miles ........................... 360/53 |
| 2005/0063086 A1 | 3/2005 | Won et al. |

* cited by examiner

*Primary Examiner*—Fred F. Tzeng
(74) *Attorney, Agent, or Firm*—Fellers, Snider, et al.

(57) ABSTRACT

Apparatus and method for rotating a data storage media having pre-formatted servo data tracks adjacent a data transfer member, and retrieving readback data with the data transfer member along a path that is non-concentric in relation to the servo data tracks. The data transfer member is controlled by a control circuit that is configured for retrieving readback data from different data storage tracks during less than one revolution of the media.

20 Claims, 5 Drawing Sheets

CERTIFYING CONCENTRIC DATA IN ECCENTRIC SERVO DATA TRACKS OF PRE-FORMATTED MEDIA

FIELD OF THE INVENTION

The claimed invention relates generally to the field of data storage and more particularly, but not by way of limitation, to an apparatus and method for certifying data storage media.

BACKGROUND

Disc drives are data storage devices that store digital data in magnetic form on a rotating disc. Modern disc drives comprise one or more storage discs that are coated with a magnetizable medium and mounted on the hub of a spindle motor for rotation at a constant high speed. Information is stored on the discs in a plurality of circular tracks, typically by an array of transducers ("heads") mounted to a radial actuator for movement of the heads relative to the discs. During a write operation data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per millimeter). Increased track density requires more closely-spaced, narrow tracks, and therefore requiring enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo-track writer ("STW") assembly during the manufacture of the disc drive. One type of STW assembly records servo pattern on the discs following assembly of the disc drive. In this embodiment, the STW assembly attaches directly to a disc drive having a disc pack where the mounted discs on the disc pack have not been pre-recorded with servo pattern. The STW essentially uses the drive's own read/write heads to record the requisite servo pattern directly to the mounted discs. An alternative method for servo pattern recording utilizes a separate apparatus having dedicated servo recording transducers or heads for recording servo pattern onto one or more discs. The dedicated servo recording heads can be used to record servo information to a number of discs simultaneously, which are subsequently loaded into the disc drive for use. In light of the trend toward higher track density, there is a demand for dedicated STW assemblies that are capable of recording servo patterns simultaneously to multiple discs for high density disc drives. However, the repositioning of discs between servo formatting and media certification procedures introduces eccentricity issues that are related to the way the discs are biased on the spindles they are mounted on.

SUMMARY OF THE INVENTION

Embodiments of the present invention are generally directed to media certification where pre-formatting of servo information is employed.

In some embodiments a media certification device is provided having a data transfer member control circuit configured for retrieving readback data from different data storage tracks during less than one revolution of the media.

In some embodiments a method is provided for rotating a data storage media having pre-formatted servo data tracks adjacent a data transfer member, and retrieving readback data with the data transfer member along a path that is non-concentric in relation to the servo data tracks.

In some embodiments a media certifier is provided having a data transfer member operably disposable in a data transfer relationship with a pre-formatted media, and means for certifying the media without track-following the pre-formatted media.

These and various other features and advantages which characterize the claimed invention will become apparent upon reading the following detailed description and upon reviewing the associated drawings.

DETAILED DESCRIPTION

Figure 1:
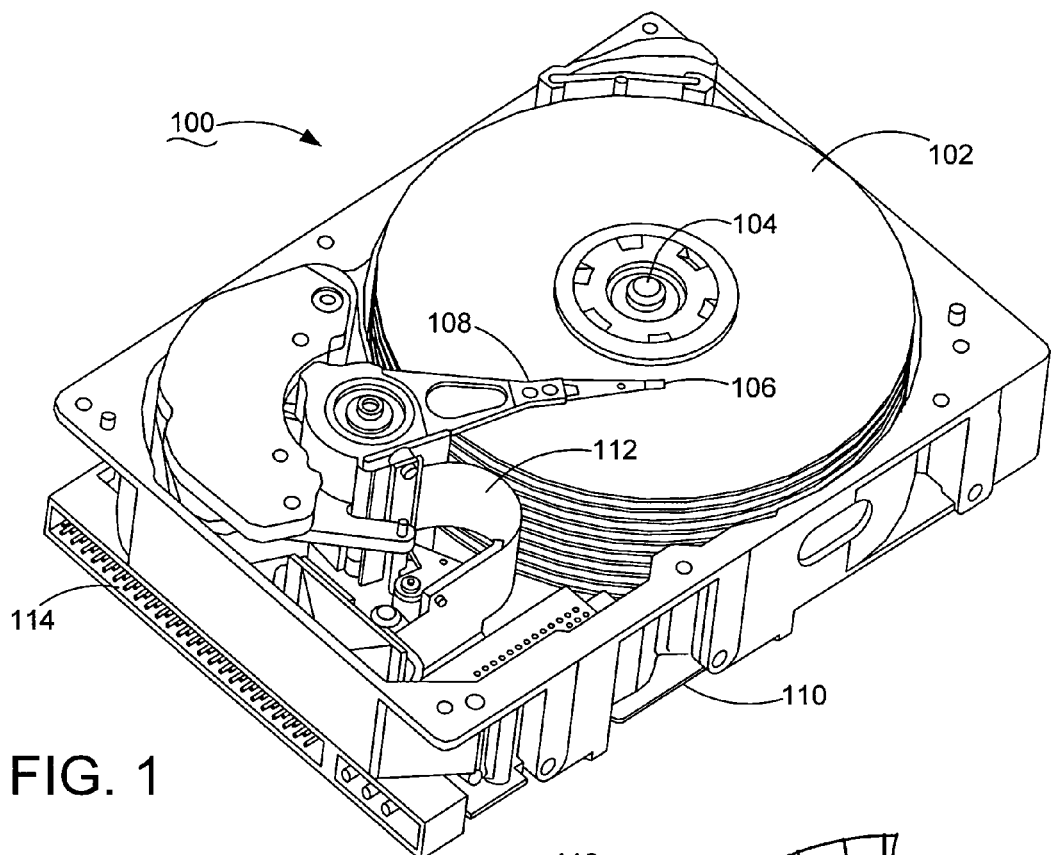
FIG. 1 is an isometric view of a disc drive data storage device in which embodiments of the present invention can be practiced.

FIG. 1 is an isometric view of an illustrative data storage device 100 suited for use with and for practicing embodiments of the present invention. In this example a plurality data storage discs 102 are rotated by a motor 104 to present data storage locations of the disc 102 to a read/write head ("head") 106. The head 106 is supported at the distal end of a rotary actuator 108 that is capable of moving the head 106 radially between inner and outer data storage tracks of the disc 102. The head 106 is electrically connected to a circuit board 110 by way of a flex circuit 112. The circuit board 110 is adapted to receive and send control signals controlling the functions of the data storage device 100. A connector 114 is electrically connected to the circuit board 110, and is adapted for connecting the data storage device 100 with remote devices for transferring commands and/or data.

Figure 2:
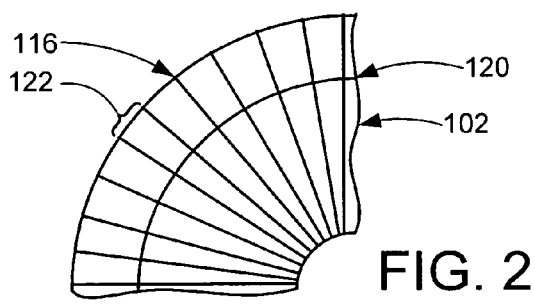
FIG. 2 is a diagrammatic depiction of the servo and data wedges into which data is stored in the data storage medium of the disc drive of FIG. 1.
Figure 3:
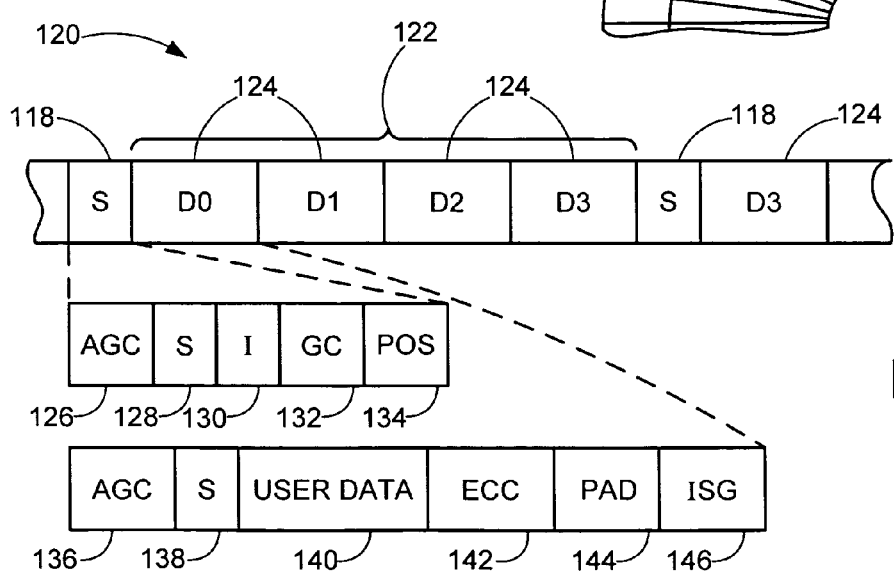
FIG. 3 is a diagrammatic depiction of the data fields in the servo and data wedges of FIG. 2.

FIGS. 2 and 3 illustrate a manner in which data can be arranged on each of the recording surfaces of the discs 102. Servo data wedges 116 are written during disc drive manufacturing and radially extend across the recording surfaces like spokes on a wheel. Each servo wedge 116 is formed from a number of servo data fields 118 for each servo data track 120. The servo data are used to detect and control the position of the heads 106.

Data wedges 122 are provided between each adjacent pair of servo wedges 116. User data fields 124 are subsequently defined in the data wedges 122 and are used to store user data in fixed size data blocks. For purposes of this description and meaning of the appended claims, the term "data track" or "track" means a track in which data is stored, whether it be servo data or user data or both. The term "servo data track" means a track formed by a plurality of servo data, with or without user data stored therein.

A general format of each servo data field 118 and user data field 124 is shown in FIG. 3. Each servo data field 118 includes an automatic gain control (AGC) field 126, a synchronization field 128, an index field 130, a Gray code (track address) field 132, and a position (POS) field 134. The AGC field 126 provides an oscillating preamble signal (such as a 2T pattern) to prepare servo control circuitry for receipt of the remaining servo data. The synchronization field 128 signals the presence of a servo data field 118 by storing a unique synchronization pattern that is a selected Hamming distance away from other possible combinations of bit patterns on the disc 102. The index field 130 indicates angular position of the servo data field 118 on the disc 102 with respect to an index point (i.e., zero rotational degrees). The Gray code field 132 provides a radial track address for the track 120, and the position field 134 enables the servo control circuitry to detect intra-track location of the head 106.

The user data fields 124 labeled D0, D1, and D2 are contiguous data fields and each include an AGC field 136, a synchronization field 138, a user data field 140, an error correction code (ECC) field 142 in which error detection and correction codes are stored, a pad field 144 and an intersector gap 146.

Typically, as part of the manufacturing process some or all of the servo wedges 116 ("bursts") are written to the disc 102. The servo wedges 116 are then used to propagate readback data 122 for the purpose of certifying that the requisite quality exists in the magnetizable medium. As mentioned previously, in some solutions both the servo data fields 118 and the readback data 124 are written by the heads 106 after the discs 102 have been installed in the data storage device 100. However, this type of "in-situ" data transfer has more recently been replaced by pre-formatting the discs 102 with servo wedges 116, such as by using a dedicated STW device. The pre-formatted discs 102 can then be subjected to a media certification procedure by repositioning them in another dedicated device known generally as a pattern verifier, including the data storage device 100 itself, in order to observe an error rate associated with writing data and then reading it back ("readback data"). Batch-production of the pre-formatted discs 102 has demonstrated proven advantages in manufacturing throughput velocity. However, it also can be problematic from the standpoint that repositioning the discs 102 will likely create eccentricity issues.

Figure 4:
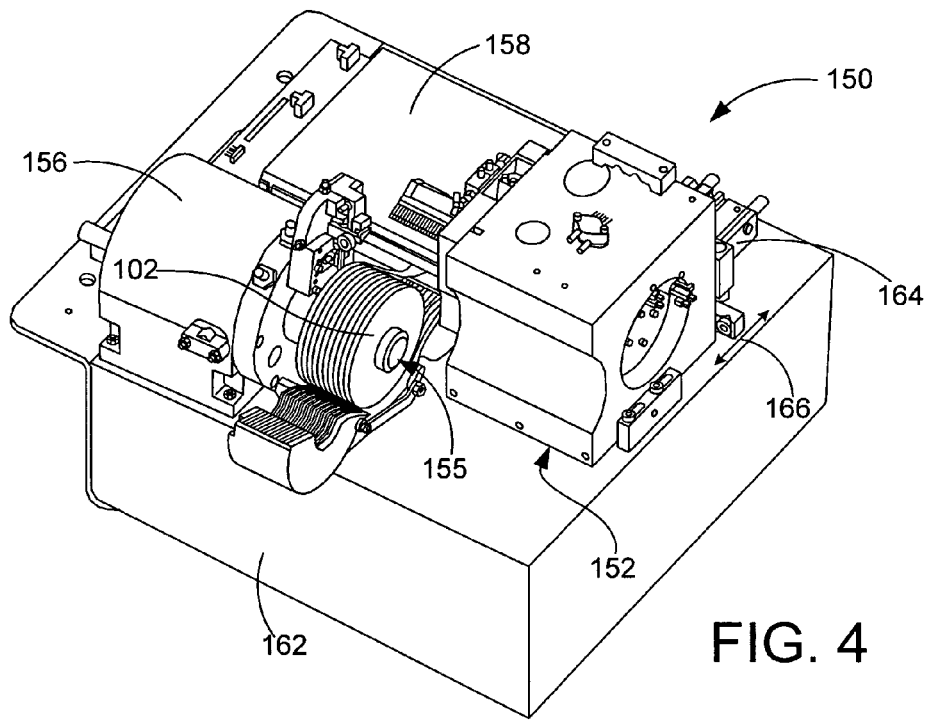
FIGS. 4 and 5 are isometric views of a servo track writer ("STW") of the type that can be used to pre-format servo patterns on the data storage medium of the disc drive of FIG. 1.
Figure 5:
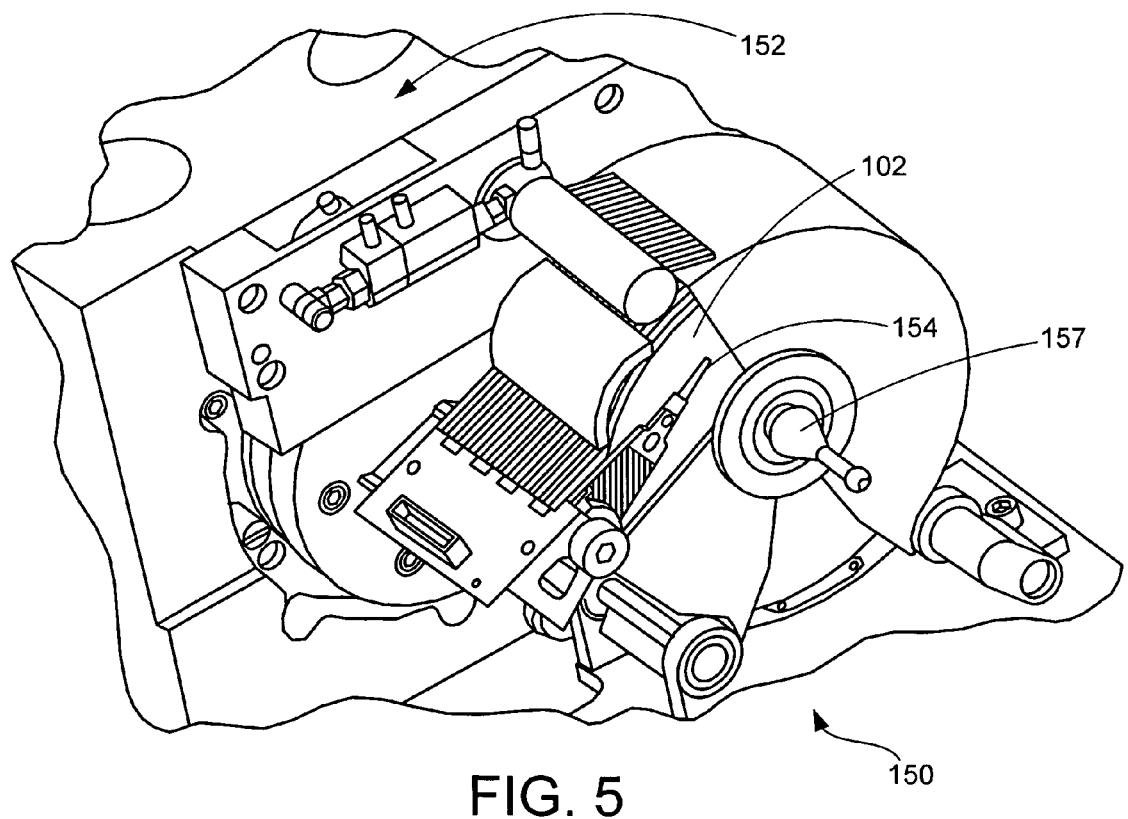

The present embodiments are particularly advantageous in the situation where the servo wedges 116 are written with one device and then the media certification is done in another device, thereby requiring re-positioning of the discs 102. FIGS. 4 and 5, for example, illustrate a dedicated multi-disc STW 150 for the accurate positioning and movement of servo recording heads during servo pattern recording on a disc, and is the subject of U.S. Pat. No. 6,775,088 that is assigned to the assignee of the present application. The STW 150 includes an actuator assembly 152 for providing rotating servo recording heads 154 necessary for recording servo patterns onto a target disc 102. A plurality of discs 102 are mounted onto a mandrel 155 and grippingly engaged at one end thereof by a spindle motor hub assembly 156. The spindle motor hub assembly 156 positions the target discs 102 in relation to the servo recording heads 154. A vacuum chuck 158 rigidly secures the actuator assembly 152 in a desired position for servo track writing. A laser interferometer measures the angular displacement and consequent positioning of the servo-recording heads 154.

The entire multi-disc servo writer 150 sits upon a substantially immobile and horizontally positioned platform or base 162. The platform 162 is substantially resistant to movements from impact type collisions, and is preferably a granite slab or other like material having sufficient size to support all the components of the STW 150. The actuator assembly 152 is connected to the platform 162 via a slide mechanism 164 for lateral movement (as indicated by arrow 166) over the platform 162 between a servo recording position (shown in FIG. 5) and a disc loading and unloading position (shown in FIG. 4)

After the servo patterns are written, the discs 102 are removed from the mandrel 155 and mounted to another device for performing the media certification ("verifier" device). For purposes of the following description the verifier device can be the data storage device 100, wherein the discs 102 are repositioned and mounted to the spindle motor 104. The skilled artisan will readily recognize, however, that in equivalent alternative embodiments the verifier device can be a dedicated piece of production equipment, and that the features and control circuitry ascribed to the data storage device 100 for purposes of practicing the present embodiments can equivalently be ascribed to any such dedicated production device.

Figure 6:
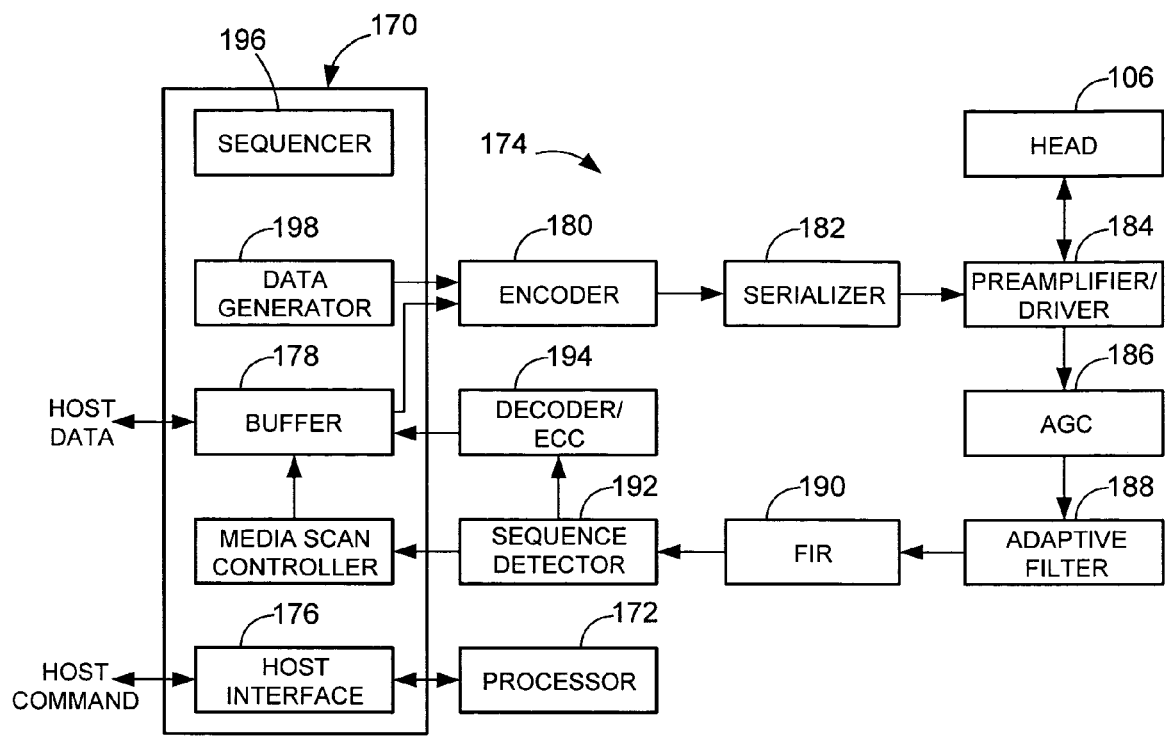
FIG. 6 is a block diagram of a data transfer member control circuit in a verification device.

FIG. 6 provides a functional block diagram of relevant circuitry of the verifier device including an interface circuit 170, processor 172 and read/write channel 174. The interface circuit 170 communicates with a host device in accordance with an industry standard protocol, such as Small Computer Systems Interface (SCSI). The processor 172 provides top level control of the verifier device. The read/write channel 174 operates to write data to the discs 102 and to retrieve readback data from the discs 102. For reference, the read channel portion of the read/write channel 174 is contemplated to use partial response, maximum likelihood (PRML) detection, although such is not limiting to the scope of the claimed invention.

During a normal data write operation, the host provides a write command to a host interface circuit 176 of the interface circuit 170 and loads the data to be written to a data buffer 178. The data are encoded by an encoder circuit 180 to provide run length limited (RLL) and error correction encoding, and the encoded data are serialized by a serializer 182. The output of the serializer 182 preferably constitutes a non-return to zero (NRZ) signal used by a preamplifier/driver circuit 184 (preamp) to apply bi-directional write currents to the data transfer head to write the data as a sequence of magnetic flux transitions on the disc recording surface.

During a subsequent readback operation, the data are transduced from the disc surface by the head to provide a readback signal that is preamplified by the preamp 184, normalized by an AGC circuit 186 and filtered by an adaptive filter 188. The filtered signal undergoes time-domain filtering to a selected class of partial response waveforms (e.g., EPR4) by a finite response filter (FIR) 190. A sequence (Viterbi) detector 192 samples the output of the FIR 190 to provide a sequence of data values representative of the encoded data written to the disc 102.

A decoder 194 removes the RLL encoding and applies on-the-fly error detection and correction to provide the recovered user data to the buffer 178 for subsequent transfer to the host device. A sequencer 196 asserts read and write gate signals to control the writing and reading of data by the read/write channel 174.

The interface circuit 170 further comprises a data generator 198 which generates a 2T oscillating pattern for use at selected times including during the media certification operation during disc drive assembly operations. During media certification, the 2T pattern can be written to each data wedge 122.

Figure 7:
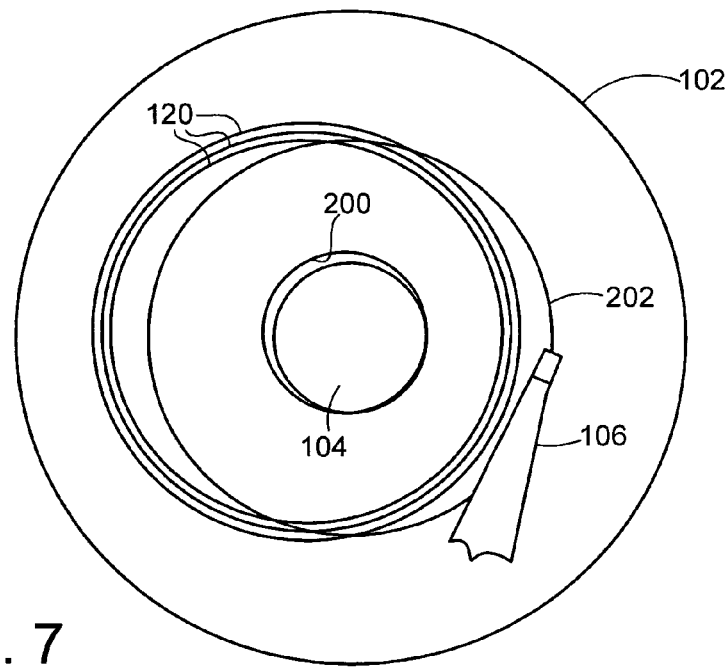
FIG. 7 is a diagrammatic depiction of the eccentricity condition arising from repositioning the discs between servo formatting and media certification.

As discussed above, however, allowances must be made for eccentricity where the discs 102 are repositioned between writing the servo patterns and performing the media certification. FIG. 7 is provided to illustrate how this eccentricity comes into play, but it is noted that the extent of the eccentricity and the clearances in FIG. 7 are visually exaggerated for clarity sake.

FIG. 7 illustrates a pre-formatted disc 102; that is, the disc 102 has previously been mounted on the mandrel 155 of the STW 150 in order write servo wedges 116 along a plurality of tracks (illustrated by three tracks) 120. The disc 102 is shown now mounted to the spindle motor 104 of the data storage device (in this case the "verifier") of FIG. 1. The disc 102 inner edge 200 defines a diameter that is larger than the hub of the spindle motor 104, thereby providing sliding clearance for mounting the discs 102 on the hub. However, this lateral clearance results in the disc center being offset from the axis of rotation. Likewise, the tracks 120 of previously written servo wedges 122 are eccentric in relation to the axis of the verifier. That is, the tracks 120 are concentric in relation to each other, but are non-concentric in relation to the axis of rotation in the verifier. Furthermore, a path of travel 202 for the verifier data transfer member (in this case head 106) when it is in a fixed radial position, is eccentric (or "non-concentric) in relation to the disc 102 center. However, the head path of travel 202 is concentric to the disc axis of rotation.

Previous attempted solutions aim to conform the head path of travel 202 to one of the eccentric servo data tracks 120. That is, track-following a selected one of the tracks 120 for media certification can be attempted by compensating the head position in relation to a position error signal (PES). However, it has been determined that where the track density is high, the PES compensation will likely inject too much positioning error to adequately identify and map all the readback errors detected during the media certification.

The present embodiments take a better tact of keeping the head substantially fixed radially. As the diagram of FIG. 7 indicates, this results in the head and its associated control circuit ("data transfer member control circuit" or "head control circuit") retrieving readback data from different data storage tracks during less than one revolution of the disc. In other words, the present embodiments contemplate that the head control circuit will likely retrieve a first readback data block 140 that is associated with a first data storage track 120, and will likely retrieve a consecutive second readback data block 140 that is associated with a second data storage track 120 different than the first data storage track 120.

Again, the eccentricities and clearances illustrated in FIG. 7 are visually exaggerated for clarity sake. As a result, the fixed-head path 202 is shown to cross only a portion of the data tracks 120. For the purposes of the description that follows, however, it is assumed that the fixed-head path 202 is disposed entirely across a plurality of the data tracks 120.

Figure 8:
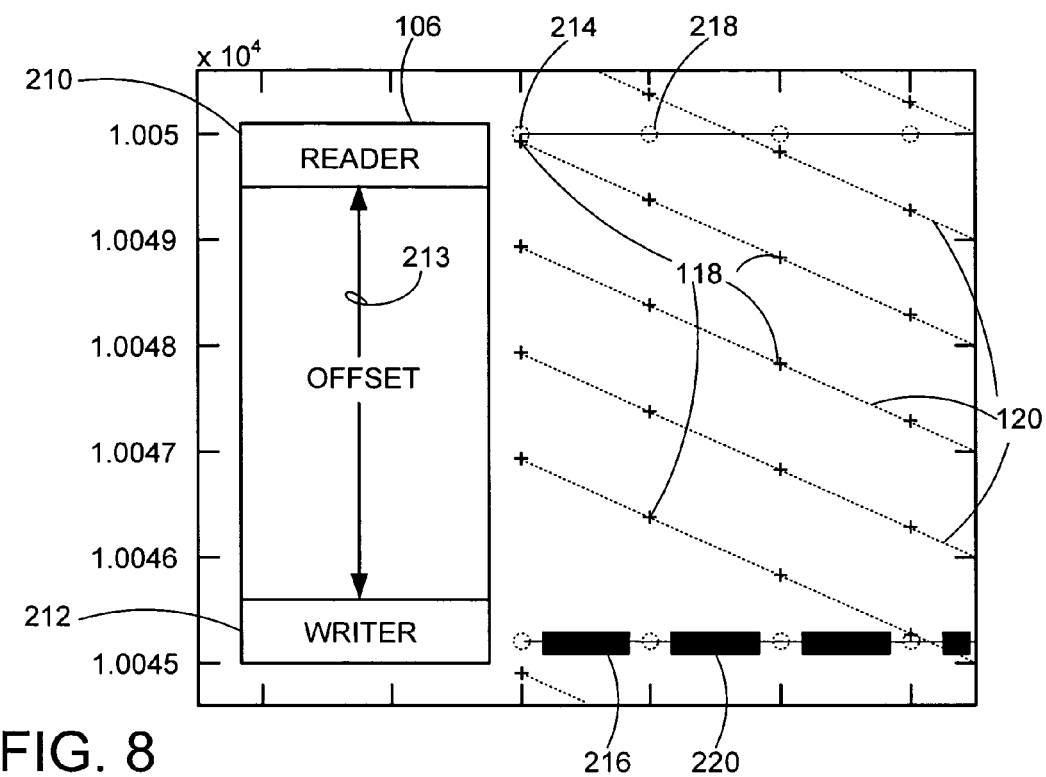
FIG. 8 is a diagrammatic depiction of the head in the $R_{write}$ position.

FIG. 8 diagrammatically depicts the head 106 having a reader element 210 and a writer element 212 that are spatially separated by an offset distance 213 (R/W offset). The verifier of the present embodiments writes a certifiable data pattern by first reading and storing a radial location $R_{write}$ 214 before writing data block 216. The verifier then reads and stores $R_{write}$ 218 before writing data block 220. This sequence of storing $R_{write}$ before writing each of the data blocks continues until a predetermined amount of data has been written.

Figure 9:
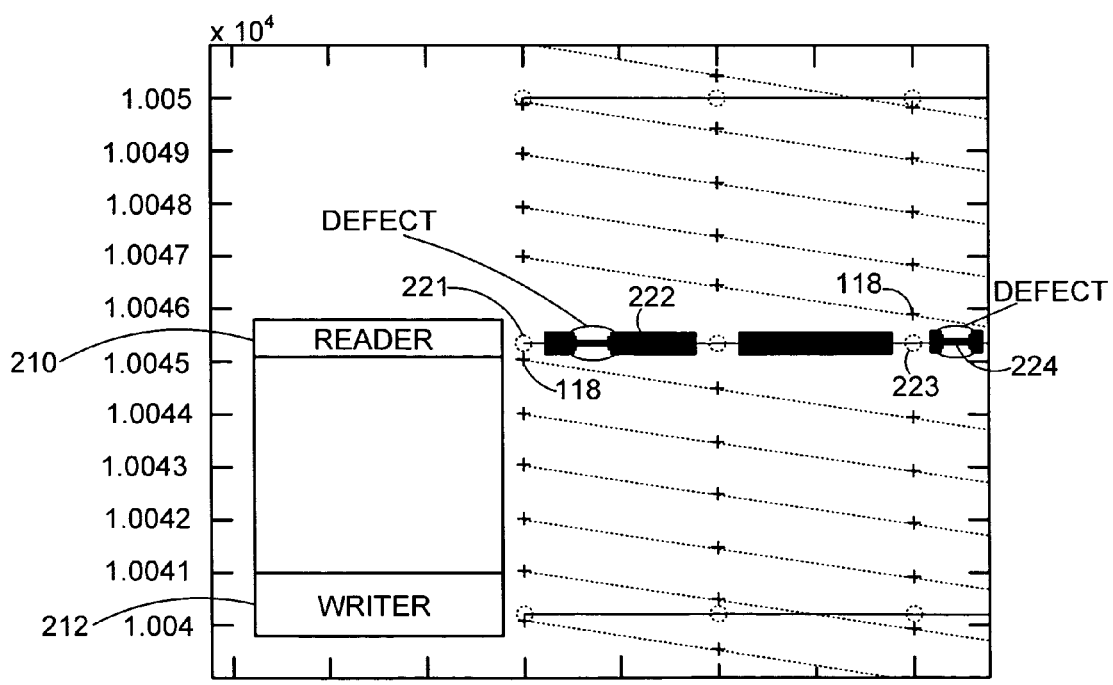
FIG. 9 is a diagrammatic depiction of the head in the $R_{cert}$ position.

FIG. 9 diagrammatically depicts the head 106 having been moved to certifying mode whereby the readback data is scrutinized for signs of media defects, such as the two defects shown in the previously written data. The radial position of the head in the certifying mode, $R_{cert}$, is defined as:

$$R_{cert} = R_{write} + R/W \text{ offset}$$

The head control circuit of the verifier associates each readback data block with one of the data storage tracks, in relation to a preceding servo burst 118. For example, the head control circuit determines that its $R_{cert}$ position 221 is nearest the servo burst 118 of track 10,045 and thereby associates readback data block 222 with that track. Similarly, the head control circuit determines that a subsequent $R_{cert}$ position 223 is nearest the servo burst 118 of track 10,046 and thereby associates readback data block 224 with that track. The defects indicated by read errors in these data blocks 222, 224 are then mapped in relation to the tracks with which they have been associated.

Figure 10:
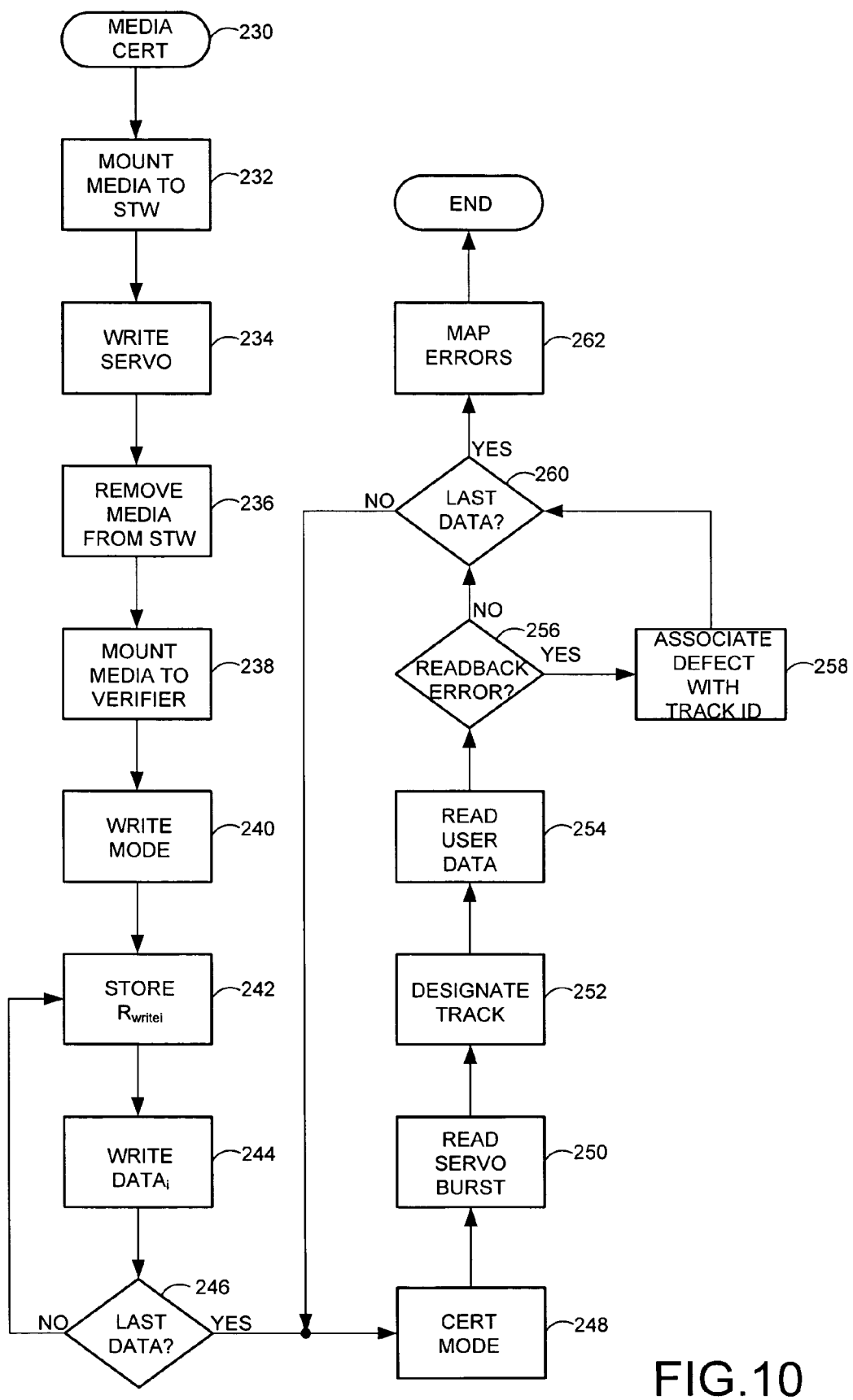
FIG. 10 is a block diagram of steps for practicing a method for MEDIA CERTIFICATION in accordance with embodiments of the present invention.

FIG. 10 is a flowchart showing steps for practicing a method 230 of MEDIA CERTIFICATION in accordance with embodiments of the present invention. The method begins in block 232 with mounting the discs 106 in the STW 150. Servo information is then written to the discs 106 in block 234, and then the discs are removed from the STW in block 236. In block 238 the discs 106 are repositioned and mounted to the verifier, and in block 240 the head control circuit moves the head to a fixed radial position for writing a certifiable pattern of data.

In block 242 $R_{writei}$ is stored in memory prior to writing data, in block 244. In block 246 it is determined whether all the readback data has been written. If no, then control returns to the sequence of blocks 242, 244; otherwise control passes to block 248.

In block 248 the head control circuit moves the head to $R_{cert}$, as defined above, for retrieving readback data with the head along a path that is non-concentric in relation to the pre-formatted servo data tracks 120. In block 250 the $R_{cert}$ radial position is seamlessly compared to the adjacent pair of servo bursts, between which it is interposed, in order to ascertain which is closest. Based on that finding, in block 252 the nearest servo burst defines the track with which the subsequent readback data block will be associated.

In block 254 the immediately next readback data block is read. It is determined in block 256 whether any readback error indicates the likelihood that a defect exists in the magnetizable medium. If yes, then in block 258 the location of the defect is associated with the track designation determined in block 252. Otherwise, in block 260 it is determined whether all the readback data have been read. If no, then control returns to block 248; otherwise, the defects are mapped in block 262 according to the track associations determined in block 258.

Generally, and in addition to that described above, the present embodiments contemplate a media certifier having a data transfer member operably disposable in a data transfer relationship with a pre-formatted media, and means for certifying the media without track-following the pre-formatted media. For purposes of the present description and meaning of the appended claims, the term "means for certifying" encompasses the present embodiments that require the verifier head to be moved substantially in a concentric path to the disc axis of rotation, and in relation to eccentric pre-formatted tracks of servo information. The term "means for certifying" expressly does not encompass other solutions whereby the verifier head position is compensated in relation to an observed position error, thereby track-following one or more of the eccentric pre-formatted servo tracks.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage device, it will be appreciated by those skilled in the art that the claimed subject matter is not so limited and various other processing systems can be utilized without departing from the spirit and scope of the claimed invention.

What is claimed is:

1. A media certification device comprising a data transfer member control circuit configured for retrieving readback data from different data storage tracks during less than one revolution of the media.

2. The device of claim 1 wherein the data transfer member control circuit is further characterized by retrieving a first readback data block associated with a first data storage track and a retrieving a consecutive second readback data block associated with a second data storage track different than the first data storage track.

3. The device of claim 2 comprising a motor for rotating the media, wherein the data transfer member control circuit guides the data transfer member along a path that is concentric in relation to a media axis of rotation, but which is non-concentric in relation to the data storage tracks.

4. The device of claim 3 wherein the data transfer member control circuit stores a radial location $R_{write}$ of the data transfer member in relation to the data storage tracks before storing a respective block of data with the data transfer member.

5. The device of claim 4 wherein the data transfer member control circuit retrieves readback data by moving the data transfer member to a radial location $R_{cert}$, where $R_{cert}=R_{write}+$R/W offset (read-write head offset).

6. The device of claim 5 wherein the data transfer member control circuit associates each readback data block with one of the data storage tracks in relation to a preceding servo burst.

7. The device of claim 6 wherein the data transfer member control circuit associates each readback data block with one of the data storage tracks in relation to a nearest immediately preceding servo burst.

8. The device of claim 7 wherein the data transfer member control circuit detects a readback error and associates the readback error with its respective data storage track.

9. The method of claim 8 wherein the data transfer member control circuit maps one or more readback errors in relation to the association with the respective data storage tracks.

10. A method comprising:
    rotating a data storage media having pre-formatted servo data tracks adjacent a data transfer member; and
    retrieving readback data with the data transfer member along a path that is non-concentric in relation to the servo data tracks.

11. The method of claim 10 wherein the rotating step is characterized by the servo data tracks being concentric in relation to each other but non-concentric in relation to a center of the media.

12. The method of claim 11 wherein the rotating step is characterized by the servo data tracks being non-concentric in relation to a media axis of rotation.

13. The method of claim 12 wherein the retrieving readback data step is characterized by storing a radial location $R_{write}$ of the data transfer member in relation to the servo data tracks before storing a respective block of data with the data transfer member.

14. The method of claim 13 wherein the retrieving readback data step is further characterized by moving the data transfer member to a radial location $R_{cert}$, where $R_{cert}=R_{write}+$R/W offset (read-write head offset).

15. The method of claim 14 wherein the retrieving readback data step is characterized by associating each readback data block with one of the servo data tracks in relation to an immediately preceding servo burst.

16. The method of claim 15 wherein the retrieving readback data step is characterized by associating each readback data block with the servo data track corresponding to a nearest immediately preceding servo burst.

17. The method of claim 16 wherein the retrieving readback data step is characterized by a first readback data block being associated with a first servo data track and a second readback data block being associated with a second servo data track different than the first servo data track.

18. The method of claim 17 wherein the retrieving readback data step is characterized by detecting a readback error and associating the readback error with its respective servo data track.

19. The method of claim 18 wherein the retrieving readback data step is characterized by mapping one or more readback errors in relation to the association with the respective servo data tracks.

20. A media certifier comprising:
    a data transfer member operably disposable in a data transfer relationship with a pre-formatted media; and
    means for certifying the media without track-following the pre-formatted media.

* * * * *